United States Patent
Kilby et al.

(10) Patent No.: US 10,359,291 B2
(45) Date of Patent: Jul. 23, 2019

(54) DETERMINING NETWORK MAPS OF TRANSPORT NETWORKS

(71) Applicant: National ICT Australia Limited, Eveleigh, NSW (AU)

(72) Inventors: Phillip Kilby, Eveleigh (AU); Matthew Robards, Eveleigh (AU)

(73) Assignee: National ICT Australia Limited, Eveleigh, NSW (AU)

(*) Notice: Subject to any disclaimer, the term of this patent is extended or adjusted under 35 U.S.C. 154(b) by 570 days.

(21) Appl. No.: 15/508,399

(22) PCT Filed: Sep. 4, 2014

(86) PCT No.: PCT/AU2014/050210
§ 371 (c)(1),
(2) Date: Mar. 2, 2017

(87) PCT Pub. No.: WO2015/039182
PCT Pub. Date: Mar. 26, 2015

(65) Prior Publication Data
US 2017/0248432 A1 Aug. 31, 2017

(30) Foreign Application Priority Data
Sep. 19, 2013 (AU) .............................. 2013903611

(51) Int. Cl.
*G01C 21/34* (2006.01)
*G06Q 10/04* (2012.01)
(Continued)

(52) U.S. Cl.
CPC ......... *G01C 21/3407* (2013.01); *G01C 21/32* (2013.01); *G01C 21/3453* (2013.01);
(Continued)

(58) Field of Classification Search
USPC ....... 455/67.11, 446; 340/429, 572.1; 705/5, 705/7.35
See application file for complete search history.

(56) References Cited

U.S. PATENT DOCUMENTS

| 4,092,718 A | 5/1978 | Wendt |
| 4,212,069 A | 7/1980 | Baumann |

(Continued)

FOREIGN PATENT DOCUMENTS

| EP | 0596570 A1 | 11/1993 |
| EP | 1939590 A1 | 7/2008 |

(Continued)

OTHER PUBLICATIONS

Van Nes R. "Design of multimodal transport networks *A hierarchical approach*" Thesis Series T2002/5.
(Continued)

*Primary Examiner* — Sam Bhattacharya
(74) *Attorney, Agent, or Firm* — Kilpatrick Townsend & Stockton LLP

(57) ABSTRACT

This disclosure relates a processor determining a network map of a transport network by. The processor optimises for each of multiple sets of nodes a travel cost of trips with a start node and an end node in that set. This way, the processor selects from each of the multiple sets one node as a hub. The travel cost is based on whether the start node or end node is the hub. The processor then optimises for each node a direct travel time between that node and a hub to select an optimised hub for that node. Finally, the processor determines a network map comprising the selected hubs connected by a first transport mode and the remaining nodes connected to the selected hub by a second transport mode. Passengers need to change less often at the hub because the hub is placed at the most popular destination or origin.

17 Claims, 5 Drawing Sheets

(51) Int. Cl.
   *G06Q 10/06* (2012.01)
   *G01C 21/32* (2006.01)

(52) U.S. Cl.
   CPC .......... *G06Q 10/04* (2013.01); *G06Q 10/047* (2013.01); *G06Q 10/06* (2013.01); *G06Q 10/0631* (2013.01)

(56) References Cited

U.S. PATENT DOCUMENTS

| | | |
|---|---|---|
| 4,220,946 A | 9/1980 | Henriot |
| 5,168,451 A | 12/1992 | Bolger |
| 5,799,263 A | 8/1998 | Culbertson |
| 6,240,362 B1 | 5/2001 | Gaspard, II |
| 6,456,207 B1 | 9/2002 | Yen |
| 6,510,383 B1 | 1/2003 | Jones |
| 6,606,557 B2 | 8/2003 | Kotzin |
| 6,675,150 B1 | 1/2004 | Camer |
| 6,756,913 B1 | 1/2004 | Ayed |
| 6,850,898 B1 | 2/2005 | Murakami et al. |
| 2006/0206363 A1* | 9/2006 | Gove ............... G06Q 10/02 705/6 |
| 2012/0209512 A1* | 8/2012 | Kujirai ............. G01C 21/3423 701/428 |

FOREIGN PATENT DOCUMENTS

| | | |
|---|---|---|
| WO | WO2009/076216 A2 | 6/2009 |
| WO | WO2003/018547 A2 | 3/2013 |

OTHER PUBLICATIONS

Garalx T. et al, "Vehicle routing problems with alternative paths: an application to on-demand transportation", European Journal of Operational Research 204, 1 (2010) 62-75.

Chapter 5.2 "Public Transport", under the patronage of the Department of Housing, C.; by CSIR Building & Technology, C. by CSIR Building, P. & Technology, C., ed. (Reprint 2005), Guidelines for Human Settlement Planning and Design, vol. I and II, CSIR Building and Construction Technology, P O Box 395, Pretoria, 0001.

C. C, Lin, S. H. Chen., "An integral constrained generalized hub-and-spoke network design problem", Transportation Research Part E 44 (2008) 986-1003.

C. C, Lin, S. H. Chen., "The hierarchical network design problem for time-definite express common carriers", Transportation Research Part B 38 (2004) 271-283.

C. I. Hsu, Y. P. Hsieh., "Direct versus hub-and-spoke routing on a maritime container network", pp. 1-16.

Intermode Final Report, "Intermode: Innovations in Demand Responsive Transport", Department for Transport and Greater Manchester Passenger Transport Executive, Jun. 2004, pp. 1-200.

* cited by examiner

DETERMINING NETWORK MAPS OF TRANSPORT NETWORKS

CROSS-REFERENCE TO RELATED APPLICATIONS

The present application claims priority from Australian Provisional Patent Application 5 No 2013903611 filed on 19 Sep. 2013, the content of which is incorporated herein by reference.

TECHNICAL FIELD

This disclosure relates to determining a network map of a transport network.

BACKGROUND ART

Many transport networks, such as public transport network, are designed and operated by complex computer systems. These computer systems operate the network such that the network provides frequent scheduled services during peak demand and less frequent scheduled services during off-peak periods as the cost for running the frequent scheduled services is not justified in those periods.

In designing the transport network, some designing computer systems follow a hub and spoke paradigm, where feeders (spokes) provide load, such as goods or passengers, over short distances to central collection points (hubs). Large capacity transport modes, such as large aircrafts or large ships, transport the loads between hubs before they are distributed by the feeders.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

A computer implemented method for determining a network map of a transport network comprises:
optimising for each of multiple sets of nodes a travel cost of trips with a start node and an end node in that set to select from each of the multiple sets one node as a hub, wherein the travel cost is based on whether the start node or end node is the hub;
optimising for each node a direct travel time between that node and a hub to select an optimised hub for that node; and
determining a network map comprising the selected hubs connected to one another by a first transport mode and the remaining nodes connected to the respectively selected optimised hub by a second transport mode.

It is an advantage that the method optimises a travel cost of trips based on whether the start node or end node is the hub. As a result, the method selects the hub such that more trips start or end at a hub, which means that passengers need to change less often at the hub to reach their destinations. In other words, the hub is placed at the most popular destination or origin.

It is a further advantage that the method optimises the direct travel time between each node and a hub. As a result, the method selects the optimised hub for each node that results in the shortest travel time to the hub, which means that passengers need to spend less time travelling to the hub.

The computer implemented method may further comprise repeating the optimisation steps to iteratively improve the network map wherein optimising the direct travel time further determines the multiple sets of transport nodes as nodes for which the same hub is selected.

The trips may be historically collected trips.

The computer implemented method may further comprise repeating the method after an operating time period, wherein the trips comprise trips traveled during the operating time period.

The operating time period may be one year, one week, one day or one hour.

The first transport mode may be a bus transport mode and the bus transport mode may be scheduled.

The second transport mode may be a taxi or minibus transport mode and the taxi or minibus transport mode may be on-demand.

The computer implemented method may further comprise storing the network map on a data store.

The computer implemented method may further comprise operating the transport network according to the network map.

The travel cost of trips may be further based on a travel time and the travel cost of trips may be further based on passenger convenience.

The computer implemented method may further comprise determining routes to connect the selected hubs.

Determining the routes may be based on the number of direct trips between hubs along the routes or on the number of transport vehicles required to service the routes and on a predefined headway.

Further, determining the routes may be based on a distance of trips between the hubs.

Software, that when installed on a computer causes the computer to perform the method above.

A computer system for determining a network map of a transport network comprises:
a data store to store trip data comprising multiple trips;
a processor
to optimise for each of multiple sets of nodes a travel cost of the trips with a start node and an end node in that set to select from each of the multiple sets one node as a hub, wherein the travel cost is based on whether the start node or end node is the hub,
to optimise for each node a direct travel time between that node and a hub to select an optimised hub for that node, and
to determine a network map comprising the selected hubs connected to one another by a first transport mode and the remaining nodes connected to the respectively selected optimised hub by a second transport mode; and
a data store to store the determined network map.

Optional features described of any aspect of method, software or computer system, where appropriate, similarly apply to the other aspects also described here.

BRIEF DESCRIPTION OF DRAWINGS

An example will be described with reference to

BEST MODE FOR CARRYING OUR THE INVENTION

Figure 1:
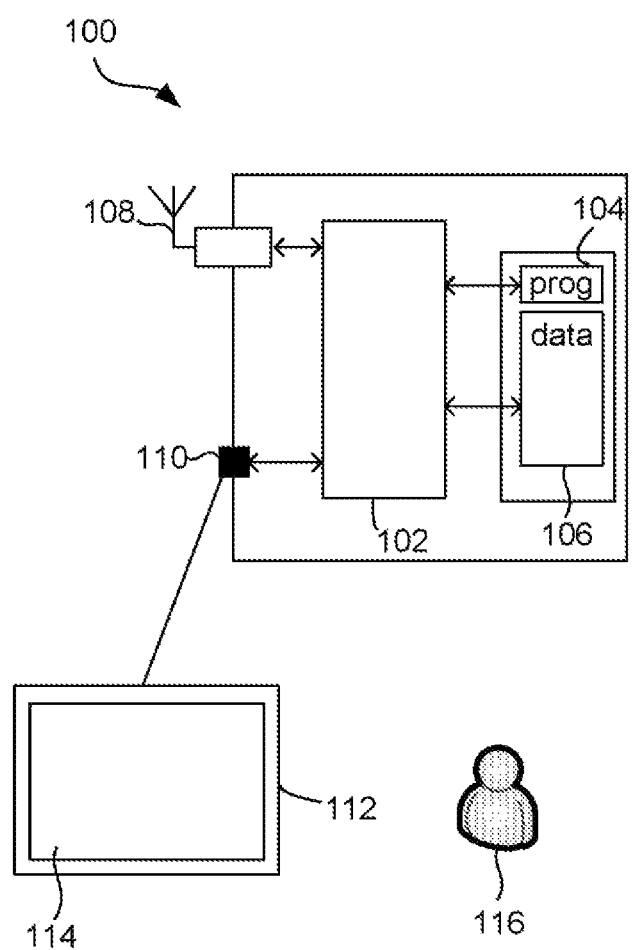
FIG. 1 illustrates a computer system for determining a network map of a transport network.

FIG. 1 illustrates a computer system 100 for determining a network map of a transport network. The computer system comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program, stored on program memory 104 causes the processor 102 to perform the method in FIG. 2, that is, the processor 102 optimises a travel cost to determine multiple hubs and then optimises a travel time between the nodes and the hubs to select a hub for each node.

Optimising in this context means changing values so that the objective, such as the travel cost, is adjusted towards an optimal solution, such as a minimum travel cost. This also includes a single step of an iterative process, at the end of which the theoretically possible optimal solution may or may not be reached. Further, optimisation may refer to a single step towards a local optimum or a global optimum.

The processor 102 may receive data, such as historical trip data, from data memory 106 as well as from the communications port 108 and the user port 110, which is connected to a display 112 that shows a visual representation 114 of the transport map to a user 116. In one example, the processor 102 receives historical trip data from data collectors, such as transport vehicles, via communications port 108, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 102 receives and processes the trip data in real time. This means that the processor 214 determines the network map including the hubs every time trip data is received from the data collectors, such as once an hour, and completes this calculation before the data collectors send the next trip data update.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 106. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines historical trip data, such as by accumulating individual trips, and stores this data in data memory 106, such as RAM or a processor register. The processor 102 then requests the data from the data memory 106, such as by providing a read signal together with a memory address. The data memory 106 provides the data as a voltage signal on a physical bit line and the processor 102 receives the historical trip data via a memory interface.

Figure 2:
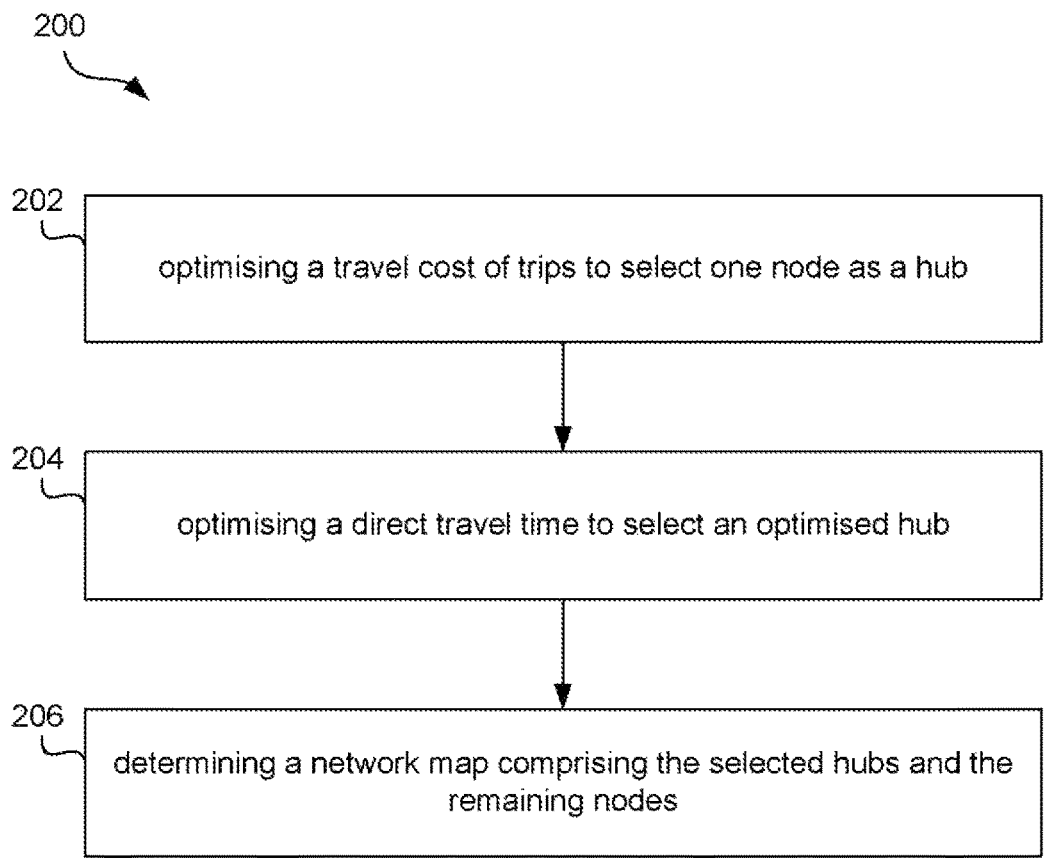
FIG. 2 illustrates a method for determining a network map in a transport network.

FIG. 2 illustrates a method 200 as performed by processor 102 for determining a network map in a transport network. The method 200 is explained with reference to a bus network with bus routes between hub locations and taxis that act as feeders between bus stops and their hubs. However, the method 200 is also applicable for other transport networks, including freight transport networks.

It is noted here that method 200 of FIG. 2 can be used as part of an iterative optimisation method to iteratively improve the network map.

Figure 3:
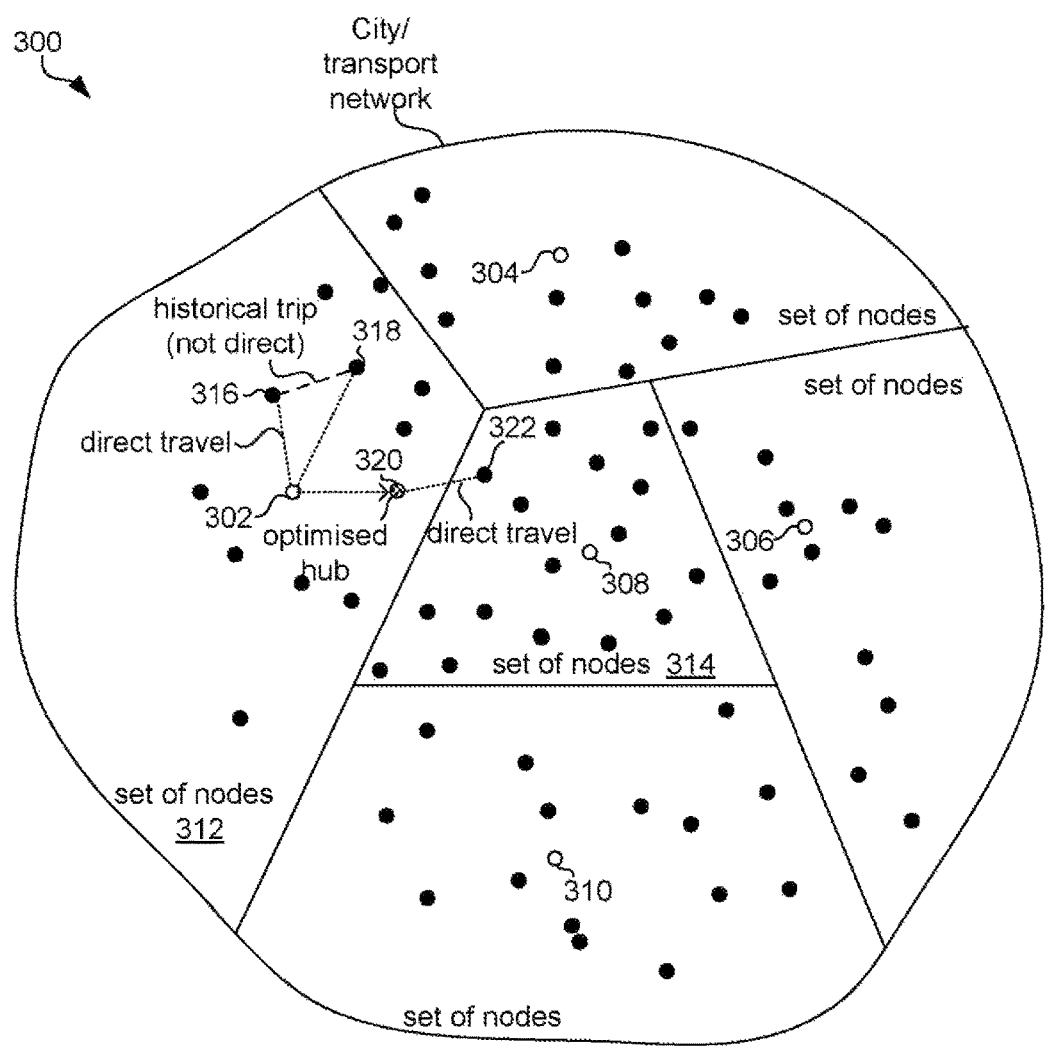
FIG. 3 illustrates a network map.

FIG. 3 illustrates a network map 300 as determined by processor 102 and then stored in data memory 106 of FIG. 1. The network map 300 comprises multiple nodes, such as bus stops, represented as dots in FIG. 3. In data memory 106, the nodes may be stored associated with a node ID, a name, and a location, such as GPS position or street address. Each of the nodes can be selected as a hub which is illustrated as a circle, such as hubs 302, 304, 306, 308 and 310.

Method 200 addresses the problem of finding the best locations for the hubs: locations where passengers will change modes between taxi and bus. Method 200 uses the best available data for demand between each origin and destination pair. For example, an outdated transport network exists and needs to be updated. This outdated transport network can be used to collect historical trip data. This means, the processor 102 has data available about the frequency of travel between each of the nodes and can optimise the transport network 300 such that a better solution is found for the most frequent trips.

The passenger behaviour may change once the transport network is optimised. For example, more passengers may use transport network 300 because it is more convenient after the optimisation. To accommodate this change, all trips in the optimised transport network 300 are collected and the network is optimised at certain intervals, such as once or twice a year.

In one example, there are no time tables provided at the bus stops and the passengers can use an electronic interface, such as a website or a smartphone app, to make a trip request. The smartphone app may be provided to the passengers and potential passengers via an app provider, such as Apple's AppStore or Google Play.

Transport network 300 uses fixed route buses only on a small "hub" network. This bus transport mode is scheduled, which means that a time table exists and the scheduled departure and arrival times of the buses are fixed at least until the next optimisation. Transport between local bus stops and hub nodes is provided by a fleet of taxis and minibuses. This taxi or minibus service is on-demand, which means that there is no fixed schedule but that each passenger requests a trip and the taxis or minibuses are scheduled individually to pick-up or drop-off each passenger.

In one example, the computer system 100 and the corresponding method 200 are implemented in the city of Canberra, Australia. Canberra is a city of 350,000 people of a geographically dispersed area. Canberra has approximately 2,800 bus stops and as a result, the network map has approximately 2,800 nodes. There is available four weekends' data giving actual trips, including time-stamped origin and destination data. Processor 102 compiles a journey table (treating linked trips as a single journey) for each weekend. Time intervals, like the 10 minute headway for buses used below, are examples only, selected for the Canberra scenario. They can be changed to suit other locations as necessary.

Frequent service can be offered between hubs. Even though hubs are served frequently, typically we expect many fewer buses will be required than is currently used in the fully fixed service.

A fleet of taxis and/or minibuses are used to ferry passengers from their starting location (bus stop) to their nearest hub, and similarly from the destination hub to final destination. These shuttle services are multi-hire services that may carry more than one passenger simultaneously. The taxis may provide direct service from origin to destination if that is more efficient than the indirect service.

In this example, all journeys are booked and paid for before departure, using a web page, phone app, or call centre. Booths may also be made available at hubs to make bookings.

The following journey profiles are possible.

Hub nodes may be located in community centres which are themselves common passenger destinations. Many trips will be simply from a local bus stop to the nearest hub node. In fact, for Canberra, the proportion of 1-leg trips is around 60% of the total.

Travel further afield will require the use of a bus. The passenger waits at their local bus stop for a maximum of 10 minutes. A taxi picks them up and takes them to their nearest hub. This trip may involve detours to pick up other passengers. At the hub, the passenger waits a short while for the bus (on average around 5 minutes) to take them on the next leg to their destination hub. Around 30% of trips in Canberra would be 2-leg trips like this.

Travelling from local bus stop to local bus stop may involve up to three legs. Travel works the same as the two-leg journey described above, except that when the passenger arrives at the second hub, there is a taxi waiting to take them on to their final destination. For Canberra, only around 10% of journeys require three legs.

During daylight hours, the service is offered from bus stop to bus stop, while a night service that is partially to-the-door is also possible.

Hub Location

Processor 102 is to choose locations for the hub nodes. Hub nodes effect the system in two ways. First, fixed-schedule routes link hub nodes, so hub node selection effects the route design problem. Second, passengers may have to move through hub nodes to complete their journey, so hub nodes effect travel time for such journeys.

A hub node placed where many people begin or end journeys has the advantage that those journeys can be completed without further mode change. However, if such a location is not in the centre of the cluster of bus stops that it serves, then extra travel time between bus stop and hub node will be incurred. Processor 102 selects hub nodes that balance out the added delay of mode change with the added travel time.

The first question is: how many hub nodes are required? In one example, processor 102 sequentially examines each reasonable number of hub nodes. For Canberra, this may involve determining a network map for 3 to 13 hub nodes.

Processor 102 may choose hub locations so that the sum of travel times plus mode change penalties is minimised.

Given k, the number of hub nodes that are required, processor 102 performs method 200 to find good hub locations by minimising the sum of a modified distance between hub nodes and local stops. Method 200 comprises a first optimisation step 202 to select nodes as hubs and a second optimisation step 204 to select a hub for each node.

Method 200 starts from an initial solution which can be a random selection of hubs or can be the solution of a previous iteration in cases where the optimisation steps 202 and 204 are performed repeatedly to iteratively refine the result. The initial solution comprises k hubs and each node is associated with one of these hubs. This means that a passenger leaving from an origin node in a taxi will change to a scheduled bus service at the hub that is associated with that origin node.

The association of nodes to hubs defines multiple sets of nodes such that all nodes that are associated with the same hub form one of the sets, such as set 312 and set 314. This is illustrated in FIG. 3 by the partitioning of the network by straight lines into areas. Each of the areas contains one hub and the nodes in each area define a set of nodes.

Processor 102 considers trips with a start node and an end node in one set. For example, a historical trip was recorded from node 312 to node 314. Both nodes 316 and 318 are in the same set 312. Since neither node 316 nor node 318 is a hub, a passenger travelling from node 316 to 318 needs to travel via hub 302. If most trips are between these two nodes 316 and 318 it would be more convenient for most passengers if one of these nodes 316 and 318 was a hub.

This convenience for the passengers is represented by a travel cost and the processor 102 optimises the travel cost. Since the selected hub is a variable of the cost function, the result of the optimisation is the selection of one node as a hub. In other words, the processor 102 optimises the cost of trips to select one node as a hub for each set. The travel cost is determined based on a modified distance function.

In one example, the modified distance function from node i to a potential hub-node h, takes into account three factors:
t(i, h), the travel time between node i and the hub.
A change-mode penalty P (a system parameter) that reflects whether the start node or the end node is the hub, that is, if i is not a hub, then passengers will have to change mode, which reflects on the convenience for the passenger.
n(i) the number of trips starting or ending at node i. The larger the number of trips, the more important that node is.

Therefore, when considering node h as a hub node, the distance from another node i to h is given by $$D(i,h)=n(i)*(t(i,h)+P) \qquad (1)$$

Given such a distance function, processor 102 may now choose k hubs so that the sum of modified distance from each bus stop to their nearest hub is minimised. In the example of FIG. 3, the optimisation of the travel cost results in an optimised hub 320. This means, passengers do not change between taxis and scheduled buses at node 302 but instead, at optimised hub 320. For clarity, FIG. 3 does not show the optimised hubs for the other sets.

In one example, a modified k-medoid algorithm is employed. Different metrics can be used to determine which is the closest hub to a given bus stop (t(i, j), and which hub should be chosen for a given cluster of nodes (D(i, j)). In some k-medoid algorithms, the same metric would be used for both purposes.

Processor 102 executes the following heuristic algorithm implemented as software in a programming language, such as C++ or Java, and stored on program store 104. In one example, processor 102 executes the algorithm 10 times, and chooses the best solution found.

k: number of hubs to choose; B: set of bus stops; t(i, j): travel time from bus stop i to bus stop j. D(i, h) modified distance function;

H: set of hubs; h(i): the hub associated with bus stop i.

1. H ← k randomly chosen (no repeats) elements of B
2. foreach i ∈ B: h(i) = arg min$_{j \in H}$t(i, j)
4. z = Σ$_{i \in B}$D(i, h(i))
5. while better solutions are being found
7. H' = ∅
6. # Find new hub centres minimising modified dist to other members
6. # currently in the same cluster
8.   for j ∈ H
9.     H' = H' ∪ arg min$_{a|h(a)=j}$ [Σ$_{b|h(b)=j}$D(a,b)]
6. # Find new closest hub for each bus stop
10.    foreach i ∈ B
11.      h'(i) = arg min$_{j \in H'}$t(i, j)
12.    z' = Σ$_{i \in B}$D(i,h'(i))
13.    if (z' < z)
14.      z = z' ; h = h' ; H = H'
15.    else
16.    done
17.  endwhile
18.  return H,h It is noted that optimisation step 202 in FIG. 2 relates to item 9 of the above algorithm while step 204 relates to item 11 of the above algorithm. This means that in step 204, processor 102 optimises the direct travel time between a node and the optimised hub. This way the processor 102 selects one of the optimised hubs for each node. For example, a bus stop 322 in FIG. 3 was originally associated with hub 308, which means that passengers to and from bus stop 322 changed at hub 308. After the optimisation step 202 the optimised hub 320 is selected which is closer to bus stop 322 than the original hub 302 has been. For simplicity it is assumed that hub 308 does not change by the optimisation step 202.

After the optimisation, travelling directly to the optimised hub 320 of set 312 would take less time than travelling to the hub 308 of set 314. As a result processor 102 selects optimised hub 320 for node 322 instead of hub 308. This changes the association of nodes and hubs and as a result also the partition of the nodes into sets. This means that the lines indicating the partition into sets would need to be re-drawn in FIG. 3 to include node 322 into set 312, which is omitted for clarity.

If a further iteration of the optimisation steps is performed, this further iteration would be based on the updated sets of nodes in the network.

Computational Experience

Figure 4:
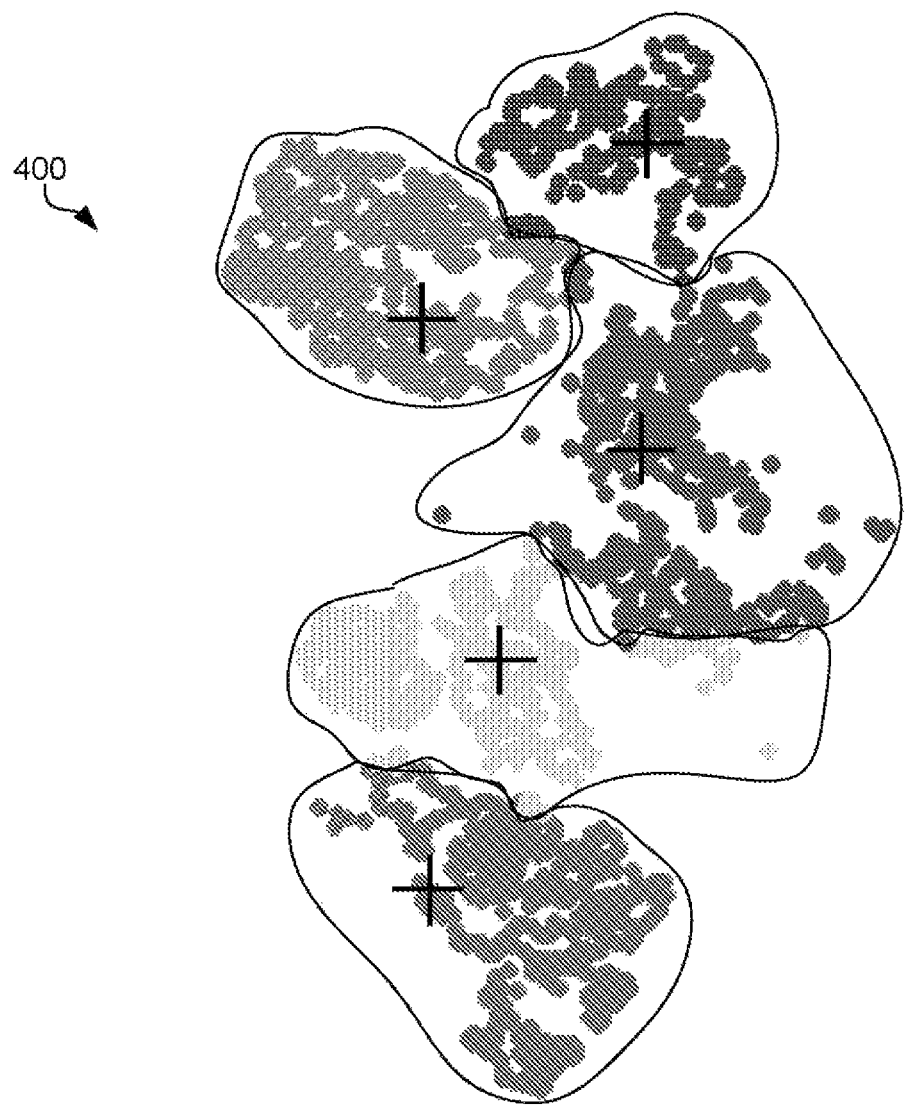
FIG. 4 illustrates five hubs chosen for the example of Canberra.

FIG. 4 illustrates five hubs chosen for the example of Canberra. Dots with the same colour/shade of gray indicate bus stops belonging to the same hub. For clarity, solid lines are added to show the region of bus stops belonging of the same hub. Crosses indicate the chosen hub.

FIG. 4 shows the solution achieved using the modified distance function. Solutions using other methods would result in many more transfers being required, because although the hubs are centrally located, very few journeys start or end at the chosen location, so most passengers would need to change mode. These solutions took a few seconds to generate, using a 3 GHz desktop computer.

Route Selection

In one example, determining the network map also comprises determining routes to connect the selected hubs. Processor 102 may create routes which minimise the number of vehicle-changes for all passengers, which means the routes depend on the number of direct trips between hubs along routes;

minimise the travel time of trips across all passengers; and which minimises the number of buses required.

This is a multi-objective problem, and the objectives can compete. For instance, it can be seen that making long routes that cover all stops will mean passengers will have few changes, but this will lead to long travel times for some passengers.

Processor 102 may process the problem as an integer linear programming problem, with a weight used to control the trade off between the cost and convenience.

First some terminology.

| | |
|---|---|
| H | The set of hub nodes to be linked |
| N | The set of bus stops to be served |
| $h_i$ | The hub node associated with bus stop i |
| M | The origin/destination matrix with $M_{ij}$ for i, j ∈ N indicating the number of passengers who travel from stop i to stop j |
| t(i, j) | The distance between stop i and stop j |

From the stop-to-stop origin/destination data M processor 102 can calculate hub-to-hub demand M' as $$M'_{ij} = \sum_{m,n \in N \cdot h_n = i, h_m = j} M_{m,n}$$

That is, $M'_{ij}$ gives the number of trips from hub i to hub j.

In one example the method selects from a predetermined set of potential bus routes R. Only circular routes are considered—i.e. routes that start and stop at the same bus stop. Each route is represented by the order of hubs along the route. If hubs i and j are linked on route $r_k \in R$ then $r_k^{ij}=1$.

If the number of hubs is small (≤6) processor 102 can enumerate all possible routes in R. For larger numbers of hubs, processor 102 may heuristically limit the routes in R. For instance, processor 102 may only allow stop i to be followed by one of its n nearest neighbours, for some value of n.

The method makes use of the concept of the benefit of a link between two bus stops i and j on a single route. One of the objectives is to choose routes so that the maximum number of people are able to travel directly from their origin to their destination without changing buses. The benefit of $b_{ij}$ of linking hubs i and j may be equal to $M'_{ij}$. That is, the benefit may be the count of all journeys going between the two hubs. This is the number of passengers who can travel without changing buses if the hubs are linked.

Processor 102 may also minimise the number of buses in use. There may be a set headway between services. E.g. a headway of 10 minutes means a buses travel 10 minutes apart, so that the maximum wait is 10 minutes. Based on the route length, processor 102 can calculate the number of buses required. For example if the route takes 1 hour to complete, a headway of 10 minutes requires 6 buses to be assigned to the route.

Give a route k and a headway, processor 102 can calculate the time required to complete the route, and calculate $N_k$, the number of buses required to service this route.

Processor 102 may process the problem in terms of decision variables y, with auxiliary decision variables x:

Given the set of potential routes R, indexed by k, variable $y_k$ is 1 if route k is selected for inclusion, or 0 otherwise. These variables indicate which routes have been selected.

The x variables measure the benefit of each link of each selected route. Variable $x_{ij}$ is 1 if the benefit of linking i and j is accrued. Variable x is constrained so that the benefit can only be accrued if there is a route selected that links i and j.

$$\max \sum_{k \in R} \sum_{i,j \in H} x_{ij} b_{ij} - \lambda \sum_{k \in R} y_k N_k \qquad (2)$$

subject to $$\sum_{k \in R} \sum_{j \in H} y_k r_k^{ij} \geq 1 \, \forall \, i \in H \qquad (3)$$

$$\sum_{k \in R} y_k \leq M_{max} \qquad (4)$$

$$x_{ij} \leq \sum_{k \in R} y_k r_k^{ij} \, \forall \, i, j \in H \qquad (5)$$

$$y_k \in \{0, 1\} \, \forall \, k \in R \qquad (6)$$

$$x_{i,j} \in [0, 1] \, \forall \, i, j \in H \qquad (7)$$

The objective maximises the accrued benefit, while accounting for the cost of running the chosen routes. The parameter λ is a parameter controlling the trade-off between cost and service. It can be interpreted as "how many more people must get a direct trip before I put on an extra bus?".

Constraint 3 ensures that each hub appears in at least one route.

Constraint 4 puts a limit on the total number of routes chosen. This constraint can be ignored if not required.

Constraint 5 ensures that the x and y variables are consistent an x variable can only be set if there is an enabling route selected. Since the $r_k^{ij}$ have 0/1 values, this formulation does not allow benefits to be double-counted: even if a second route covers i and j, constraint 7 limits the benefit to 1.

Constraints 6 ensures that y variables are 0 or 1, and Constraint 7 ensures that the x variables are between 0 and 1.

This formulation does not optimise for ensuring passengers travel the shortest distance. The definition of benefit may incorporate this objective as well. In this formulation, the benefit of linking two hubs may be proportional to the distance that must be traveled along the mute linking them. Define a weighted score $s_{ij}$ as $$s_{ij} = \frac{l(i, j)}{l_k(i, j)} M'_{ij} \qquad (8)$$

where $d_k(i, j)$ is the distance between i and j on route k. Thus, if a passenger must travel twice as far on route k to go from i to j, then the score (benefit) of that trip is halved.

In our formulation, equation 5 may be replaced with $$x_{i,j} \leq \sum_{k \in R} (y_k s_k^{ij}) \forall \, i, j \in H \qquad (9)$$

Note that this formulation allows some double counting. If two routes serve i and j, the benefit will be allowed to increase, up to the maximum value of 1 for $x_{ij}$. Thus, if two mutes serve i and j, but the distance on both is twice the direct distance, the maximal benefit of 1.0 will still be achieved. This is not a bad approximation, since the frequency of service is also doubled.

In the case of a large number of hubs, it may be difficult to generate all possible routes. One solution is to heuristically limit the number of columns, as previously discussed. Another method is to use a column generation procedure to generate new columns after solving with an initial set. The dual values associated Constraint 5 will drive the column generation, along with dual values associated with Constraint 3. A longest path procedure (since this is a maximisation problem) will select arcs to add to the route. The cost of the path will be balanced by the extra contribution of the second term in the objective, related to the cost of the buses required. If any new route can be found with a positive reduced cost, it will be added, and the procedure can be repeated.

Computational Experience

Figure 5:
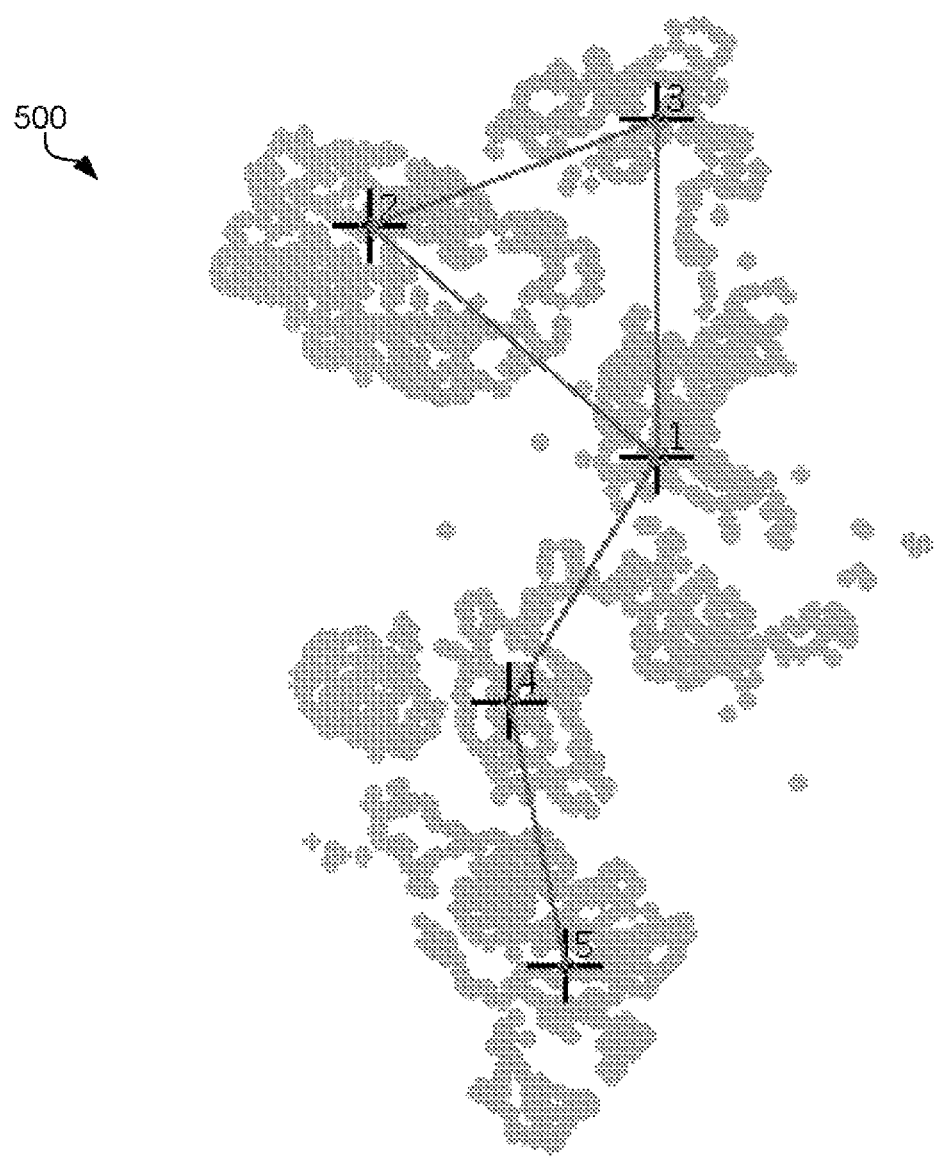
FIG. 5 illustrates determined routes for the example given in FIG. 4.

FIG. 5 illustrates the solution 500 for the 5-Hub example given in FIG. 4. Because of the small number of hubs, processor 102 could enumerate all possible routes, and select the best combination. The procedure selected two mutes. The first was as shown in FIG. 5, run in a clockwise direction. The second route performs the loop in a counter-clockwise direction. A slight asymmetry in the demand matrix meant that in the second route chosen, the Southernmost leg, from Hub 4 to Hub 5 in the diagram, was omitted. However, for ease of explanation to passengers, the two routes may be simple clockwise/counterclockwise reflections. The increase in cost is easily justified by the simplicity of use.

In one example, processor 102 performs the methods described above to select hubs and routes for 3, 4, 5, 6, 8, 10 and 12 hubs. Processor 102 can then run the example data through a simulation system that emulates the operation of the proposed system. The computations may be based on gathered data on passenger travel time, number of taxis, taxi distance traveled, taxi waiting time.

The results for the 3-hub solution provided the best results for the Canberra data we studied.

A smaller number of hubs gave greater concentration in demand, resulting in better use of taxis.

The smaller number of hubs also led to compact bus routes, also allowing for efficient operation.

Larger numbers of hubs led to more complicated and more expensive bus routes, while still requiring a significant number of taxi trips.

After the processor 102 has determined the network map 300, the network can be operated according to the network map 300. In one example, computer system 100 not only determines the network map but also operates the network. This means that processor 102 receives trip requests from passengers at departure nodes, such as bus stops. If a departure node is not a hub, the processor 102 schedules a taxi or minibus service and dispatches this service to pick-up the passenger either as soon as possible after receiving the request or after a departure time requested by the passenger.

Similarly, the request includes an arrival node and if that node is not a hub, the processor 102 schedules and dispatches a taxi or minibus service to transport the passenger to that arrival node.

An example use case is now provided.

A passenger rings (or uses web/phone app) to book their travel—bus-stop to bus-stop. They are given a 10-minute window at their departure stop and are told they will be picked up sometime within that window.

They arrive at the bus stop, and are picked up by a taxi [not a bus]. The taxi may already have other passengers on board, and may deviate to pick up other passengers. (The taxi may be a mini-bus or other "shared vehicle")

They are dropped at a hub location, where they catch a high-frequency bus to their destination hub (max 10 mins wait).

If that hub is not their final destination, a taxi is waiting to pick them up—their name is displayed in the window. This is an advantage, and part of the "system": each taxi is allotted certain passengers to achieve efficient routing for the taxis, and short travel times for customers. Each passenger should take that taxi allotted to them.

The allotted Taxi takes them to final destination (another nominated bus stop in the system). The user of the system nominates the destination bus stop. This could even be a nominated 'intersection' for some cities.

The 10 minute figures used here are variable parameters. They may be efficient, based on modelling for Canberra, but may vary in other locations.

Some advantages of the proposed solution are:

The system offers more convenience at lower cost.

Travel times and wait times are greatly reduced (based on our simulation tests for Canberra—results are available).

Bus fleet operates traditionally, but with fewer buses required.

Eg. in Canberra; presently have 90 buses running on a weekend; Under our simulation Canberra would use only 6 buses. Per km monetary cost to the central authority of paying a taxi is less than half that of per km bus running costs.

Further savings are obtained from matching taxi fleet size with demand in real time; ergo costs are reduced. In Canberra, a max of 100 taxis is used, but often fewer than 50 are in use.

Passengers may book before travel.

Bus routes are specifically designed to operate within the hub-and-shuttle system. The bus routes are specifically designed to balance passenger convenience (desiring fewer changes encourages long routes) against cost-to-operate (shorter bus routes require fewer buses, and so are cheaper to run). Processor 102 may start with a complete re-design of the fixed-route service. The hubs are again specifically chosen to work in a hub-and-shuttle system, to balance taxi travel distance (which encourages more hubs) against concentration in demand (which encourages fewer hubs). The hubs are also located so as to minimise passenger transfers. A Central Controller may choose a vehicle for each booking in a way that maximizes efficiency. Passengers may not be locked into travel to their closest hub. Passengers may get direct travel on a taxi if efficient.

The system may use other modes such as public bicycles as feeder vehicles. The system may offer door to door services at night (rather than bus stop to bus stop).

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating". "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for determining a network map of a transport network, the method comprising:
   optimising for each of multiple sets of nodes a travel cost of trips with a start node and an end node in that set to select from each of the multiple sets one node as a hub, wherein the travel cost is based on whether the start node or end node is the hub;
   optimising for each node a direct travel time between that node and a hub to select an optimised hub for that node;
   determining a network map comprising the selected hubs connected to one another by a first transport mode and the remaining nodes connected to the respectively selected optimised hub by a second transport mode; and
   repeating the optimisation steps to iteratively improve the network map wherein optimising the direct travel time further determines the multiple sets of transport nodes as nodes for which the same hub is selected.

2. The computer implemented method of claim 1, wherein the trips are historically collected trips.

3. The computer implemented method of claim 1, further comprising repeating the method after an operating time period, wherein the trips comprise trips travelled during the operating time period.

4. The computer implemented method of claim 1, wherein the first transport mode is a bus transport mode.

5. The computer implemented method of claim 4, wherein the bus transport mode is scheduled.

6. The computer implemented method of claim 1, wherein the second transport mode is a taxi or minibus transport mode.

7. The computer implemented method of claim 6, wherein the taxi or minibus transport mode is on-demand.

8. The computer implemented method of claim 1, further comprising storing the network map on a data store.

9. The computer implemented method of claim 1, further comprising operating the transport network according to the network map.

10. The computer implemented method of claim 1, wherein the travel cost of trips is further based on a travel time.

11. The computer implemented method of claim 1, wherein the travel cost of trips is further based on passenger convenience.

12. The computer implemented method of claim 1, further comprising determining routes to connect the selected hubs.

13. The computer implemented method of claim 12, wherein determining the routes is based on the number of direct trips between hubs along the routes.

14. The computer implemented method of claim 12, wherein determining the routes is based on the number of transport vehicles required to service the routes and on a predefined headway.

15. The computer implemented method of claim 12, wherein determining the routes is based on a distance of trips between the hubs.

16. A non-transitory computer readable medium with an executable program stored thereon that when executed causes a computer to perform the method of claim 1.

17. A computer system for determining a network map of a transport network, the computer system comprising:

a data store to store trip data comprising multiple trips;

a processor to optimise for each of multiple sets of nodes a travel cost of the trips with a start node and an end node in that set to select from each of the multiple sets one node as a hub, wherein the travel cost is based on whether the start node or end node is the hub, to optimise for each node a direct travel time between that node and a hub to select an optimised hub for that node, to determine a network map comprising the selected hubs connected to one another by a first transport mode and the remaining nodes connected to the respectively selected optimised hub by a second transport mode, and to repeat the optimisation steps to iteratively improve the network map wherein optimising the direct travel time further determines the multiple sets of transport nodes as nodes for which the same hub is selected; and a data store to store the determined network map.

\* \* \* \* \*